3,347,644

ISOCYANATOSULFUR AND ISOTHIOCYANATOSULFUR PENTAFLUORIDES AND THEIR PREPARATION

Charles W. Tullock, Wilmington, Del., assignor to E. I. du Pont de Nemours and Company, Wilmington, Del., a corporation of Delaware No Drawing. Filed June 27, 1962, Ser. No. 205,555
9 Claims. (Cl. 23—357)

ABSTRACT OF THE DISCLOSURE

Claimed are the compounds $SF_5NCO$ and $SF_5NCS$, the first useful as a water repellant and the second as a solvent. They may be prepared by reacting $SF_5NHCF_3$ with a carboxylic or carbothiolic acid in the presence of an alkali metal fluoride.

This invention relates to, and has as its principal objects provision of. two novel and useful compounds containing the $SF_5^-$ function and methods for the preparation of the same.

*Field of the invention*

*Summary and details of the invention*

The two novel compounds of this invention are isocyanatosulfur pentafluoride and isothiocyanatosulfur pentafluoride, i.e., the compounds of the formula $SF_5NCX$ where X is oxygen or sulfur. A first method of preparing these compounds is by reacting (dichloromethyleneamino)sulfur pentafluoride, $SF_5N{=}CCl_2$, or (difluoromethyleneamino)sulfur pentafluoride, $SF_5N{=}CF_2$, with water or hydrogen sulfide ($H_2X$), respectively. A second, alternative, method of preparing the compounds is by reacting (trifluoromethylamino)sulfur pentafluoride with a carboxylic or carbothiolic acid and an alkali metal fluoride.

In accomplishing the first method for making the present novel compounds, a pressure reactor is conveniently charged with $H_2X$ and either $CF_5N{=}CCl_2$ or $SFN_5{=}CF_2$, the reactor is closed, and the charge heated to a temperature of up to 150° C. The reaction mixture is thereafter allowed to cool to ambient temperature and the desired reaction product is isolated by distillation or other means known to those skilled in the art. The reaction of this process of the invention can be illustrated by the equations ($SF_5N{=}CCl_2$ only is shown for the sake of brevity):

$$SF_5N{=}CCl_2+H_2O \rightarrow SF_5NCO+2HCl$$
$$SF_5N{=}CCl_2+H_2S \rightarrow SF_5NCS+2HCl$$

(Dichloromethyleneamino)sulfur pentafluoride, $$SF_5N{=}CCl_2$$

one of the reactants usable in the first process of the invention, may be prepared by reacting sulfur chloride pentafluoride, $SF_5Cl$, with cyanogen chloride, ClCN, in the presence of ultraviolet light, as described below:

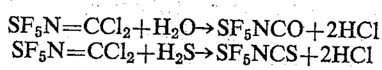

$$SF_5Cl + ClCN \xrightarrow{UV} SF_5N{=}CCl_2$$

A 12-liter round-bottom flask containing 14 g. of cyanogen chloride and 37 g. of sulfur chloride pentafluoride, $SF_5Cl$, was irradiated for 6.5 hours at ambient temperature. The contents were then removed and allowed to warm gradually to ambient temperature. The liquid distilling above room temperature from this experiment and from a second one in which 14 g. of cyanogen chloride and 33 g. of $SF_5Cl$ were irradiated for eight hours was composited to give 37 g. of product. This weight corresponded to a 38% conversion, based on $SF_5Cl$, of colorless $SF_5N{=}CCl_2$, B.P. 86–88° C. The foreshot, B.P. 35–86° C., amounting to 6.4 g. was $SF_5N{=}CCl_2$ contaminated with a small amount of $S_2F_{10}$. The product (dichloromethyleneamino)sulfur pentafluoride, $SF_5N{=}CCl_2$, reacted with 10% sodium hydroxide solution to give a solution containing both chloride and fluoride ions.

*Analysis.*—Calcd. for $CCl_2F_5NS$: Cl, 31.70; F, 42.41; S, 14.28. Found: Cl, 32.37; F, 42.44; S, 13.63.

The $F^{19}$ n-m-r spectrum indicated that an $SF_5$ group was present. The infrared spectrum showed absorption at 6.10$\mu$ (C=N—) and in the 10.5 to 12.0$\mu$ region ($SF_5$). Mass spectrometric analysis was satisfactory. Peaks corresponding to the parent (223), to $SF_5$ (127), and to $CCl_2$ (82) were found to be present. The alternate structure for this compound, $SF_5CCl{=}NCl$, was eliminated when hydrogen fluoride was found to convert it to $SF_5NHCF_3$, and sodium fluoride was found to convert it to $SF_5N{=}CF_2$.

(Difluoromethyleneamino)sulfur pentafluoride, $$SF_5N{=}CF_2$$

is prepared by reacting (dichloromethyleneamino)sulfur pentafluoride with an alkali metal fluoride in the presence of a suitable reaction medium, e.g., tetramethylene sulfone, as described below:

$$SF_5N{=}CCl_2+2NaF \rightarrow SF_5N{=}CF_2+2NaCl$$

To a suspension of 25 g. of sodium fluoride in 50 ml. of tetramethylene sulfone was added 17.8 g. of $SF_5N{=}CCl_2$ at ambient temperature. The contents were rapidly heated to 75° C. and then at 75–156° C. for 0.75 hour, during which time the volatile products removed were collected in a solid carbon dioxide-acetone cooled trap. The volatile material thus obtained was combined with that from a second experiment using 24 g. of $SF_5N{=}CCl_2$. Distillation of the composite yielded 6 g., B.P. 5–9° C. (I), and 12 g., B.P. 9–12.5° C. (II). Mass spectrometric analysis of II was satisfactory for $SF_5N{=}CF_2$, (difluoromethyleneamino)sulfur pentafluoride, with the highest mass being the parent peak (211). The $F^{19}$ n-m-r spectrum showed the presence of an $SF_5$ and a $CF_2$ group. Infrared analysis showed absorption at 5.58$\mu$ (>C=N—), at 7.45$\mu$ and 7.60$\mu$ (C—F), and in the 11 to 12$\mu$ region ($SF_5$). Infrared analysis also showed that cut I also was 80–90% $SF_5N{=}CF_2$; therefore, the product was obtained in about a 45% conversion.

*Analysis.*—Calcd. for $CF_7NS$: F, 69.63; S, 16.75. Found: F, 68.50; S, 16.98.

The temperatures used in the reaction of $SF_5N{=}CCl_2$ or $SF_5N{=}CF_2$ with water or hydrogen sulfide can vary from 25° to 150° C. but generally are from 70° to 125° C.

When water is used as the reactant, the reaction can be conducted in open or closed reactors under autogenous pressure. The use of excess water is to be avoided since water hydrolyzes $SF_5NCO$.

When hydrogen sulfide is used, the reaction is conducted in a closed reactor under autogenous pressure conditions. If desired, however, externally applied pressure, sufficient to maintain the hydrogen sulfide in the liquid state, can be used. Excess hydrogen sulfide can be used in the reaction with $SF_5N{=}CCl_2$, or $SF_5N{=}CF_2$, particularly in reactions carried out below 100° C. However, in reactions of $SF_5N{=}CCl_2$, or $SF_5N{=}CF_2$, with hydrogen sulfide in the presence of added sodium fluoride (added to absorb hydrogen fluoride and/or hydrogen chloride) the use of excess hydrogen sulfide is detrimental.

If desired, a reaction medium, other than the $H_2X$ compound, can be used. When such a medium is used, it can equal or exceed the combined weights of the $SF_5N{=}CF_2$ or $SF_5N{=}CCl_2$ and $H_2X$ compound by many fold. Suitable media are those which are nonreactive with either the $SF_5N{=}CCL_2$, $SF_5N{=}CF_2$, or $H_2X$ compound. Exemplary of such are diethyl and dimethyl ethers, carbon tetrachloride, cyclohexane, and the like.

In the second, or alternative, process for preparing the novel compounds of the invention, a reactor is charged with (trifluoromethylamino)sulfur pentafluoride, $$SF_5NHCF_3$$

an alkali metal fluoride, and a carboxylic acid, $RCO_2H$, or a carbothiolic acid, $$R\underset{\underset{O}{\|}}{C}{-}SH$$

where R is alkyl, preferably of up to 18 carbons, or aryl, preferably of up to 11 carbons, closed, and the charge is then heated under autogeneous pressure, for from 15 minutes to four hours at temperatures up to 150° C. Thereafter the charge is permitted to cool, the reactor is opened, and the contents discharged. The desired reaction product is recovered from the reaction mixture by distillation, or other method known to those skilled in the art. This reaction involves one mole of (trifluoromethylamino)sulfur pentafluoride, two moles of alkali metal fluoride, and one mole of carboxylic or carbothiolic acid, in accord with the equations:

$$SF_5NHCF_3+2MF+RCOOH\rightarrow RCOF+2MHF_2+SF_5NCO$$

$$SF_5NHCF_3+2MF+RCOSH\rightarrow RCOF+2MHF_2+SF_5NCS$$

(Trifluoromethylamino)sulfur pentafluoride, $$SF_5NHCF_3$$

is prepared by reacting (dichloromethyleneamino)sulfur pentafluoride with hydrogen fluoride, HF, under autogenous pressure, as described below:

$$SF_5N{=}CCl_2+3HF\rightarrow SF_5NHCF_3+2HCl$$

A mixture of 23 g. of $SF_5N{=}CCl_2$ and 23 g. of hydrogen fluoride was heated at 70–80° C. for two hours, under autogeneous pressure, and then stored over sodium fluoride at room temperature and autogeneous pressure to remove hydrogen chloride and unreacted hydrogen fluoride. Distillation of the product yielded 14.7 g., amounting to a 68% conversion, of $SF_5NHCF_3$, (trifluoromethylamino)sulfur pentafluoride, B.P. 28.5 to 31° C., and 1.9 g. of a product with a B.P. 31.5 to 34° C. Mass spectrometric analysis showed a peak corresponding to the parent (211) and lower mass fragments which supported the (trifluoromethylamino)sulfur pentafluoride structure. The infrared spectrum showed absorption at 2.88$\mu$ and 6.80$\mu$ (NH), at 8.38$\mu$ (C—F), and at 10.97$\mu$ and 11.43$\mu$ ($SF_5$). The $F^{19}$ n-m-r spectrum indicated that an $SF_5$ and a $CF_3$ group were present.

*Analysis*.—Calcd. for $CHF_8NS$: F, 72.04; S, 15.17. Found: F, 71.78; S, 15.91.

The alkali metal fluorides usable are those of sodium, potassium, rubidium, and cesium. Of these, sodium fluoride is preferred because of its effectiveness, relatively low cost and availability. The amount of alkali metal fluoride employed is at least two moles per mole of (trifluoromethylamino)sulfur pentafluoride in the charge.

The carboxylic or carbothiolic acid reactant can be any alkanoic carboxylic or carbothiolic acid but the preferred acids are those which contain no more than 18 carbon atoms. The acid reactant can also be any aryl carboxylic or aryl carbothiolic acid but the preferred such carboxylic acids are the monocarboxylic acids of up to 11 carbon atoms. Exemplary of acids of the above kinds are acetic, propionic, butyric, octanoic, dodecanoic, octadecanoic, thiolacetic, thiolpropionic, thiolbutyric, thiolhexanoic, thioloctanoic, thioldecanoic, benzoic, toluic, naphthalene carboxylic, thiolbenzoic, thioltoluic, and the like.

The acid is employed in amount which is the molar equivalent of the (trifluoromethylamino)sulfur pentafluoride. A larger amount of acid can be used, if desired, and the excess recovered for reuse after the reaction is complete.

The reaction between the $SF_5NHCF_3$, alkali metal fluoride, and carboxylic or carbothiolic acid is usually carried out in a closed reactor under autogeneous pressure at temperatures which can vary from 100° to 250° C. but are generally held in the range of 125° to 225° C.

The time of reaction in both the first and second processes described above can vary from a few minutes up to six hours.

Isocyanatosulfur pentafluoride, $SF_5NCO$, and isothiocyanatosulfur pentafluoride, $SF_5NCS$, react with alcohols to form urethanes and with hydroxyl-containing and secondary amide group-containing polymers to form polymers having modified properties.

*Embodiments of the invention*

The examples which follow are submitted to illustrate and not to limit this invention.

EXAMPLE I $$\text{(A)}\ SF_5NHCF_3+C_6H_5CO_2H+2NaF\rightarrow SF_5NCO+C_6H_5COF+2NaHF_2$$

A mixture of 88 g. of benzoic acid, 103 g. of sodium fluoride, and 129 g. of (trifluoromethylamino)sulfur pentafluoride, $SF_5NHCF_3$, were heated at 100° C. for one hour, and then 200° C. for one hour, under autogenous pressures in a 500 ml. "Hastelloy" C pressure reactor. The 81 g. of volatile product recovered on distillation yielded 11 g. of foreshot, B.P. −39° to 0° C. and 61 g. (amounting to a 79% conversion) of $SF_5NCO$, B.P. 5.0 to 5.5° C. Infrared analysis of the foreshot indicated it was 65% $SF_5NCO$ and 25% $SO_2F_2$, with a small amount of $SOF_4$. The infrared analysis showed strong absorption at 4.4$\mu$ for NCO and strong absorption in the 11–12$\mu$ region for $SF_5$. Mass spectrometric analysis was satisfactory for $SF_5NCO$, and showed peaks corresponding to the parent (169), to the parent minus fluorine (150), to $SF_5$ (127), to $SF_3$ (89), and to COF (47).

The $F^{19}$ nuclear magnetic resonance spectrum at 56.4 m.c.p.s. standardized against $CCl_2F{-}CCl_2F$ showed the following peaks (in c.p.s.), all on the minus side: −8670, −8656, −8515 and the following nine smaller peaks: −7890, −7755, −7705, −7620, −7595, −7550, −7455, −7420, and −7300.

*Analysis*.—Calcd. for $CF_5NOS$: F, 56.21; S, 18.93. Found: F, 55.37; S, 18.99.

(B) Isocyanatosulfur pentafluoride, $SF_5NCO$, reacts with hydroxyl group-containing compounds to form urethanes, as exemplified below:

$$SF_5NCO+C_6H_5CH_2OH\rightarrow SF_5NHCO_2CH_2C_6H_5$$

A mixture of 15 g. of $SF_5NCO$, prepared as above, 9.6 g. of benzyl alcohol, and 20 ml. of carbon tetrachloride was allowed to stand at 25° C. and autogenous pressure over the weekend, then warmed at 90° C. for two hours. The 20 g. of white solid (amounting to an 81% conversion) recovered was dissolved in 130 ml. of hot carbon tetrachloride and the solution allowed to cool to room temperature, whereupon there was obtained nearly quantitative recovery of $SF_5NHCO_2CH_2C_6H_5$, M.P. 101–102° C. The infrared spectrum (nujol mull) showed, in addition to the nujol peaks, absorption at 3.0$\mu$ (—NH), at 5.7 to 5.8$\mu$ (C=O), and broad absorption in the 11–12$\mu$ region ($SF_5$).

*Analysis*.—Calcd. for $C_8H_8F_5NO_2S$: C, 34.66; H, 2.89; F, 34.30. Found: C, 34.83; H, 2.61; F, 34.01.

A test portion of the product was suspended in water at 25° C. for 17 hours without reaction or fluoride ion formation. The preparation of this derivative of $SF_5NCO$ provided further experimental data for its structure.

EXAMPLE II $$SF_5N{=}CCl_2 + H_2S \rightarrow SF_5NCS + 2HCl$$

(A) A mixture of 59 g. of $SF_5N{=}CCl_2$ and 59 g. of hydrogen sulfide was heated at 80° C. for two hours and autogenous pressure in a 500 ml. "Hastelloy" C pressure reactor. After storage over sodium fluoride pellets, the crude product yielded on distillation, 49 g. of $H_2S$, B.P. −52° C., 3.4 g. (7% conversion) of $SF_5NCS$, B.P. 47–48° C., and 48 g. of unreacted $SF_5N{=}CCl_2$, B.P. 83.5–88.5° C. The infrared spectrum of the $SF_5NCS$ showed absorption at 5.12$\mu$ (NCS) and strong absorption at 10.97$\mu$ ($SF_5$). The $F^{19}$ nuclear magnetic resonance spectrum at 56.4 m.c.p.s. showed the presence of an $SF_5$ group. Mass spectrometric analysis was satisfactory, showing a peak corresponding to the parent (185) and lower mass fragments which supported the $SF_5NCS$ structure.

*Analysis.*—Calcd. for $CF_5NS_2$: F, 51.35; S, 34.59. Found: F, 51.06; S, 34.28.

(B) In another experiment in which 45 g. of $SF_5N{=}CCl_2$, 25 g. of hydrogen sulfide, and 50 g. of sodium fluoride were heated at 75° C. for one hour and 125° C. for two hours, distillation of the liquid product yielded the following cuts:

| Cut No. | Boiling Point | Wt. (g.) | Products |
|---|---|---|---|
| 1 | 22.5–37 | 1.7 | $CS^2$, $SF_5NHCF_3$, $SF_5NCS$ |
| 2 | 37–39 | 5.2 | {50 mole Percent $SF_5NCS$; |
| 3 | 39–40 | 3.2 | {50 mole Percent $CS_2$. |
| 4 | 42–44.3 | 5.4 | 80 mole percent $SF_5NCS$; 20 mole percent $CS_2$. |

Infrared analyses of the fractions indicated that $SF_5NCS$ was obtained in about a 25% conversion. On cooling, a sample containing $SF_5NCS$ and $CS_2$ to −10° to −20° C., two layers separated indicating that the $SF_5NCS$ can be separated from the $CS_2$ in this manner.

This experiment suggests that it would be desirable not to use an excess of hydrogen sulfide since it reacts with $SF_5N{=}CCl_2$, particularly in the presence of sodium fluoride.

EXAMPLE III $$SF_5NHCF_3 + 2NaF + C_6H_5COSH \longrightarrow SF_5NCS + C_6H_5\overset{O}{\overset{\|}{C}}F + 2NaHF_2$$

A mixture of 34 g. of $SF_5NHCF_3$, 20 g. of sodium fluoride, and 19 g. of thiolbenzoic acid $$(C_6H_5\overset{O}{\overset{\|}{C}}SH)$$

was heated at 75° C. for one hour, and 150° C. for one hour in a 300 ml. "Hastelloy" C pressure reactor. The 25 g. of volatile product recovered was allowed to warm up to room temperature; the 22 g. remaining was distilled through a spinning band column to yield the following fractions:

| Cut No. | Boiling Point, ° C. | Wt. (g.) | Product (mole percent) |
|---|---|---|---|
| 1 | 26–35 | 9.5 | {$SF_5NCS$ (40) {$SF_5NCO$ (10) {$SF_5NHCF_3$ (60) |
| 2 | 35–45 | 1.7 | {$SF_5NCS$ (70) {$SF_5NHCF_3$ (30) |
| 3 | 45–50 | 5.4 | $SF_5NCS$ |

Residue=1.7 g.; volatiles collected in trap during distillation=0.8 g. (2.9 g. loss during distillation). Infrared analysis showed cut No. 3 to be chiefly $SF_5NCS$. The overall conversion to $SF_5NCS$, based on $SF_5NHCF_3$, was about 35%.

The compound $SF_5NCS$ has been found to be a solvent for low molecular weight polytetrafluoroethylene. The solutions thus obtained can be applied to fibrous materials such as paper, fabrics, wood, etc., to impart fire-retardant and water-repellent properties.

The compound $SF_5NCO$ has been used to impart water repellency to cotton cloth. For example, cotton broadcloth (5.87 g.) was heated with 18 g. of $SF_5NCO$ at 75° C. for two hours and autogenous pressure. This resulted in a 7% weight gain of the cloth. The surface appeared to be somewhat unevenly modified with a white precipitate; this probably resulted fom the fact that the cloth was folded to get it into the bomb. Drops of water were placed on samples of the treated and untreated cloth, and the time for the absorption of the droplet of water noted (this is really the time for "wet-through" of the cloth).

Time for "wet-through," seconds:

| | |
|---|---|
| Untreated cloth | 2–3 |
| Treated cloth | 120–360 |

Since obvious modifications and equivalents in the invention will be evident to those skilled in the chemical arts, I propose to be bound solely by the appended claims.

The embodiments of the invention in which an exclusive property or privilege is claimed are defined as follows.

I claim:

1. Compounds having the formula $SF_5NCX$ wherein X is selected from the group consisting of oxygen and sulfur.

2. Isocyanatosulfur pentafluoride of the formula $SF_5NCO$.

3. Isothiocyanatosulfur pentafluoride of the formula $SF_5NCS$.

4. The process of preparing the compounds of claim 1 which comprises reacting $SF_5NHCF_3$ and a member of the group consisting of carboxylic acids of the formula RCOOH, R being alkyl or aryl, and carbothiolic acids of the formula RCOSH, R being as above, in the presence of an alkali metal fluoride.

5. The process of claim 4 wherein the alkali metal fluoride is sodium fluoride.

6. The process of preparing the compound of claim 2 which comprises reacting $SF_5NHCF_3$ with benzoic acid in the presence of an alkali metal fluoride.

7. The process of claim 6 wherein the alkali metal fluoride is sodium fluoride.

8. The process of preparing the compound of claim 3 which comprises reacting $SF_5NHCF_3$ with thiolbenzoic acid in the presence of an alkali metal fluoride.

9. The process of claim 8 wherein the alkali metal fluoride is sodium fluoride.

References Cited

UNITED STATES PATENTS 3,228,981 1/1966 Tullock ------------ 260—543

OTHER REFERENCES

Meldrum et al.: "Introduction To Theoretical Chemistry," 1936, pp. 122–124.

Attaway et al.: "Journal Of The American Chemical Society," volume 81, pages 3599–3603 (July 20, 1959).

Moeller: "Inorganic Chemistry," 1952, pages 463–466.

MILTON WEISSMAN, *Primary Examiner.*

MAURICE A. BRINDISI, *Examiner.*

UNITED STATES PATENT OFFICE
CERTIFICATE OF CORRECTION

Patent No. 3,347,644 October 17, 1967

Charles W. Tullock

It is hereby certified that error appears in the above numbered patent requiring correction and that the said Letters Patent should read as corrected below.

Column 1, line 25, strike out "Field of the invention", in talics, and insert the same before line 20 as a heading; line 2, for "$CF_5N=CCl_2$" read -- $SF_5N=CCl_2$ --; same line 42, for $SFN_5=CF_2$" read -- $SF_5N=CF_2$ --; column 5, in the first table, ourth column, line 1 thereof, for "$CS^2$" read -- $CS_2$ --.

Signed and sealed this 26th day of November 1968.

AL)

est:

vard M. Fletcher, Jr.

esting Officer

EDWARD J. BRENNER

Commissioner of Patents